(No Model.)
G. A. BOBRICK.
ADJUSTABLE SUPPORT FOR FURNITURE.
No. 541,653. Patented June 25, 1895.
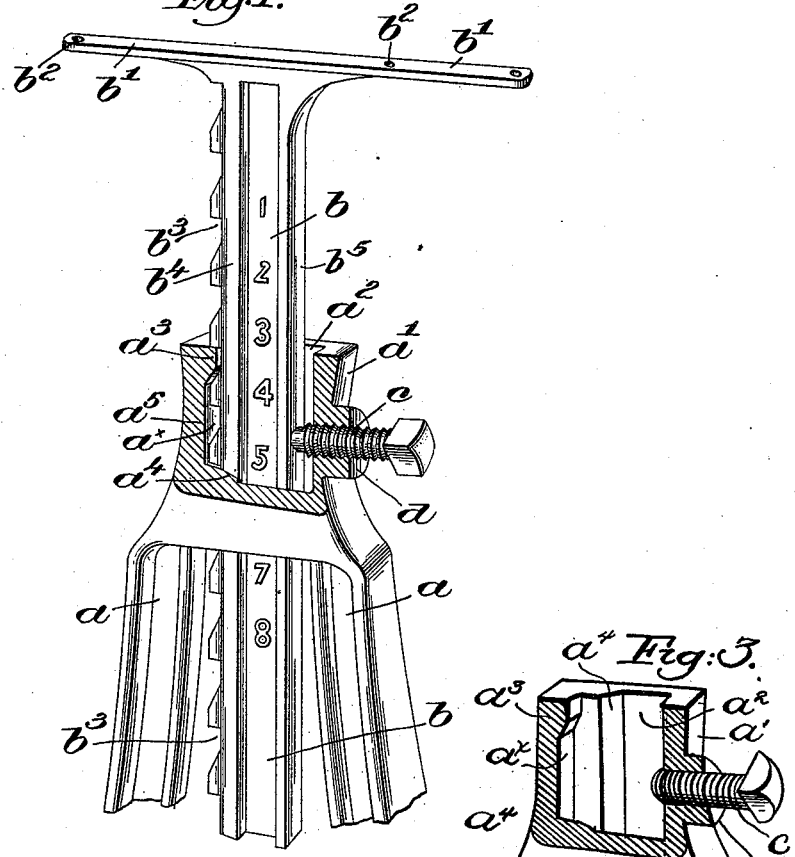
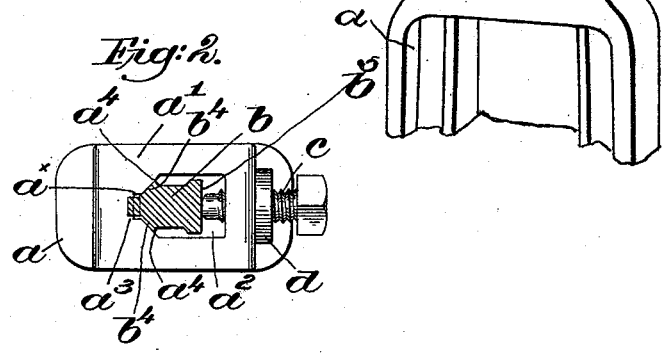
Witnesses.
Fred S. Greenleaf.
Thomas J. Drummond.
Inventor:
Gabriel A. Bobrick.
by Crosby & Gregory
attys.

UNITED STATES PATENT OFFICE.

GABRIEL A. BOBRICK, OF BOSTON, MASSACHUSETTS.

ADJUSTABLE SUPPORT FOR FURNITURE.

SPECIFICATION forming part of Letters Patent No. 541,653, dated June 25, 1895.

Application filed May 29, 1894. Serial No. 512,913. (No model.)

*To all whom it may concern:*

Be it known that I, GABRIEL A. BOBRICK, of Boston, county of Suffolk, State of Massachusetts, have invented an Improvement in Adjustable Supports for Furniture, of which the following description, in connection with the accompanying drawings, is a specification, like letters on the drawings representing like parts.

This invention has for its object the production of a simple, durable and readily adjustable support for furniture, particularly adapted for desks and seats, the support being so constructed that during the process of adjustment the movable member thereof will not drop or slide down by its own weight, nor settle before or after adjustment, and the adjustment can be made by one person.

Desks fitted with my improved support can be readily adjusted even if the floor is so imperfect or warped as to throw the fixed portions of the supports out of plumb.

My invention consists of an adjustable support for furniture, comprising a fixed member having an open head, a supporting shoulder projecting into the opening thereof at one side, and long, separated converging bearings in the head located at each side of the shoulder, to leave a clearance space between the end wall and the inner edges of the separated bearings, and below said shoulder, combined with a longitudinally adjustable member movable in the open head, elongated converging faces formed on one side of said member and adapted to rest on the converging bearings in the head, a series of notches on the same side of the member and intermediate said faces, one or the other of which notches is engaged by the shoulder, the remaining portion of the notched side below the engaged notch freely entering the clearance space, and a clamping screw adapted to bear against the opposite plane side of the movable member to seat it in its bearings, the shoulder being also retained thereby in engagement with a notch, substantially as will be described.

Other features of my invention will be hereinafter described and particularly pointed out in the claim.

Figure 1 represents in perspective and partly broken out a furniture support embodying my invention, the base being broken off to save space. Fig. 2 is a top or plan view of the support shown in Fig. 1, the movable member being in section; and Fig. 3 is a perspective view, partly broken out, of the base or standard, with the movable member omitted.

Referring to the drawings, I have shown the upper part of the base or standard $a$, which forms the fixed member of the support, adapted to be secured at its lower end, not shown, to the floor in usual manner, the said base being preferably made of cast iron. The upper end or head $a'$ of the base has an opening $a^2$ therethrough, a shoulder $a^3$ projecting into said opening at one side, best shown in Fig. 1, and the side walls of the opening $a^2$ at each side of the shoulder $a^3$ form long bearings $a^4$, said bearings being preferably beveled, and converging toward the end wall $a^5$ of the opening. A longitudinal space or clearance $a^\times$ is left between the end wall $a^5$ and the inner edges of the bearings $a^4$, and below the shoulder $a^3$ for a purpose to be described.

The movable member of my furniture support consists essentially of a straight bar or shank $b$, of cast iron or other suitable material adapted to loosely enter the opening $a^2$ of the base, the upper end of said bar or shank being herein shown as provided with arms $b'$ having suitable holes $b^2$ therein, whereby the said member $b$ may be rigidly attached to a desk, chair, &c., by screws or bolts. A series of notches $b^3$ is formed on one side of the bar or shank $b$. The bar $b$ has faces $b^4$ formed thereon at each side of the series of notches, beveled as shown, to fit closely the bearings $a^4$ when the movable member is clamped to the base, said faces extending substantially the length of the bar. By this construction a long and rigid bearing is obtained at all times for the movable member, the beveled faces $b^4$ being centered, as it were, by the similarly beveled bearings $a^4$ in the head, and at such time the shoulder $a^3$ engages one of the notches $b^3$ and positively supports the movable member, making it impossible to settle or drop down after clamping, even should the clamping device become loosened.

The clearance space $a^\times$ below the shoulder $a^3$ allows free movement of the notched side of the movable member when it is being adjusted, and when clamped said notched side does not bear against the end wall $a^5$ of the base opening, and consequently no strain is put upon the notched side.

The plane side $b^5$ of the movable member is engaged by a clamping device, herein shown as a set screw or bolt $c$ extended through a threaded boss $d$ on the base, and located opposite the interior bearings $a^4$.

To adjust the support the clamp is loosened and the shoulder $a^3$ disengaged from one of the notches $b^3$, and the movable member is moved up or down to the desired height, tightening of the clamp moving the member $b$ into place so that its faces $b^4$ are seated on the bearings $a^4$. By such construction it is impossible to crack or break the bar or shank $b$ when clamped, for the pressure of the clamping device is exerted opposite the long bearings on which the movable member is seated, and the bearings also correctly position and prevent any lateral play of said member. If the bar bore at one point against the shoulder $a^3$ and at another point against the end wall $a^5$, pressure applied by the clamping device to the bar between such points would crack or break it with comparative ease.

Referring to Fig. 2, it will be seen that the opening $a^2$ in the base is considerably wider than the thickness of the bar $b$ of the movable member.

Desks or other articles of furniture requiring a plurality of supports are often difficult to adjust, because imperfections or warping of the floor will throw the supports out of plumb, and cause great friction by the binding of the parts. I overcome such objection in my invention by making the base opening $a^2$ large enough to allow free play of the movable member when its faces $b^4$ are withdrawn from the bearings $a^4$, and the movable members can be moved in the bases without binding on the side walls. If the supports remain plumb and the desk is raised or lowered, the movable members pass through the centers of the openings $a^2$.

The numbers on the sides of the bars $b$ are convenient when used with desks or seats as scales for readily adapting the furniture to the height of the pupil.

I claim—

An adjustable support for furniture consisting of a fixed member having an open head, a supporting shoulder projecting into the opening thereof at one side, and long, separated converging bearings in the head located at each side of the shoulder, to leave a clearance space between the end wall and the inner edges of the separated bearings, and below said shoulder, combined with a longitudinally adjustable member movable in the open head, elongated converging faces formed on one side of said member and adapted to rest on the converging bearings in the head, a series of notches on the same side of the member and intermediate said faces, one or the other of which notches is engaged by the shoulder, the remaining portion of the notched side below the engaged notch freely entering the clearance space, and a clamping screw adapted to bear against the opposite plane side of the movable member to seat it in its bearings, the shoulder being also retained thereby in engagement with a notch, substantially as described.

In testimony whereof I have signed my name to this specification in the presence of two subscribing witnesses.

GABRIEL A. BOBRICK.

Witnesses:
JOHN C. EDWARDS,
GEO. W. GREGORY.